Oct. 1, 1968

C. G. BUFORD ET AL

3,403,826

POWER ACTUATED DISPENSING VALVE

Filed Jan. 11, 1965

CHARLES GILBERT BUFORD
WESLEY ELLIS BUFORD
INVENTORS

BY William P. Green

ATTORNEY

Oct. 1, 1968　　　C. G. BUFORD ET AL　　　3,403,826
POWER ACTUATED DISPENSING VALVE
Filed Jan. 11, 1965　　　　　　　　　　　　6 Sheets-Sheet 6

CHARLES GILBERT BUFORD
WESLEY ELLIS BUFORD
INVENTORS

BY William P. Green
ATTORNEY

United States Patent Office 3,403,826
Patented Oct. 1, 1968

3,403,826
POWER ACTUATED DISPENSING VALVE
Charles G. Buford, 17727 Laxford Ave., Azusa, Calif. 91702, and Wesley Ellis Buford, 1045 N. Azusa, Covina, Calif. 91722
Filed Jan. 11, 1965, Ser. No. 424,610
16 Claims. (Cl. 222—334)

ABSTRACT OF THE DISCLOSURE

A device for filling a predetermined quantity of liquid into a flexible bag, including a scale on which the bag is placed and carrying a holder having jaws for gripping a filling neck of the bag, with a filling spout being movable into engagement with the neck and adapted to fill liquid into the bag. Automatic control means responsive to the scale act to automatically close off the flow of fluid when liquid of a predetermined weight has been filled into the bag. The fluid controlling valve has a pneumatically operated actuating unit which is detachable from the valve to expose the valve parts for cleaning, with detachment of the actuating unit being effected by merely shifting it bodily relative to the valve and transversely of the axis of movement of the valve. A capping device is mounted for shifting movement between a position in which it receives a cap from a magazine holding a series of the caps to a position in which the cap is then attached to the filled bag.

---

This invention relates to an improved apparatus for filling a predetermined product into a container. The invention is in certain respects especially adapted for the filling of milk into flexible plastic bags, and will be described primarily as applied to that use.

It has recently become popular in many areas to package milk in plastic bags, rather than in bottles, cartons, or the like, especially for uses in which several quarts or gallons are to be packaged in a single container. These bags are formed of fully flexible polyethylene film, and usually carry near one corner of the bag an inlet fitting which may be formed of a more rigid polyethylene or similar material. In view of the flexibility of the bag, conventional types of filling equipment are not easily applicable to the filling of such bags.

A major object of the present invention is to provide a filling machine which can be utilized effectively for the filling of milk or other liquids into such a flexible bag, and which can do so rapidly and with little manual effort, and preferably in a manner very accurately measuring the quantity of fluid filled into each bag. The apparatus is desirably also adapted to apply closures to the bags as they are filled, so that in a very short interval a bag may be filled with a metered quantity of liquid and capped to a sealed condition for removal to a delivery or storage location. As will appear, some features of the invention are applicable to, and are of use in, the filling of other types of containers.

In order to facilitate filling of the desired product into a flexible bag of this type, I utilize a holder structure which is adapted to engage and hold the inlet fitting of the bag, and locate that fitting at a predetermined position in spite of the inability of the fully flexible walls of the bag to themselves properly support or locate the inlet fitting. In conjunction with this holding structure, I employ a filling unit or fitting which is so located as to fill the milk or other product into the container when its inlet is located by the holder. Preferably, the filling unit is mounted for retracting movement between an active filling position and an offset retracted position. This movement may be a swinging motion, combined preferably with an axial movement toward and away from the inlet fitting, so that the filling unit may retract in two different directions toward the retracted position.

The capping or closing of the bag inlet may be accomplished by a capping mechanism which is also mounted for movement between a pick-up location at which it can receive and pick up an individual cap or other closure, and a cap applying location directly opposite the inlet of the bag. The cap may be held by a carrier element forming a socket recess within which the cap is frictionally receivable, and which carrier may be mounted for rotation and limited axial movement to screw the cap onto the bag inlet. The cap carrier may be mounted on a swinging arm for movement between the discussed positions, and may function to automatically actuate a feeding mechanism in response to shifting movement of the carrier, which feeding mechanism may function to successively feed caps from a magazine to the pick-up location.

For measuring the quantity of milk or other product filled into each container, I preferably utilize a weighing scale, having a support so located as to support a bag or other container at the filling position, and adapted to automatically close a filling valve when the scale indicates that a desired quantity of the product has been filled into the container.

A particular object of the invention is to provide a valve assembly or filling unit for discharging the milk or other fluid directly into a container, and which is so designed as to faciliate disassembly of this structure and complete cleaning in a minimum of time, as is highly desirable and virtually essential in the handling of milk. At the same time, this valve should be adapted for power actuation. To attain these purposes, I provide an assembly in which the valve and a body structure containing the valve are separable from a power operated actuating unit which functions to move the valve between its open and closed positions. This actuating unit may be a piston and cylinder mechanism, and is desirably separable by a single motion of this entire unit relative to the valve carrying body. A first quick release connection may be provided between the body of the actuating unit and the valve body, while a second quick release connection may be provided between the piston or other movable part of the actuating unit and the valve element. Both of these connections are preferably designed to include interfitting parts which move into and out of interfitting connecting relation by movement of one of the units relative to the other in a direction transversely of the axis of the valve and/or piston.

The above and other features and objects of the invention will be better understood from the following detailed description of the typical embodiments illustrated in the accompanying drawings, in which:

3

Figure 1:
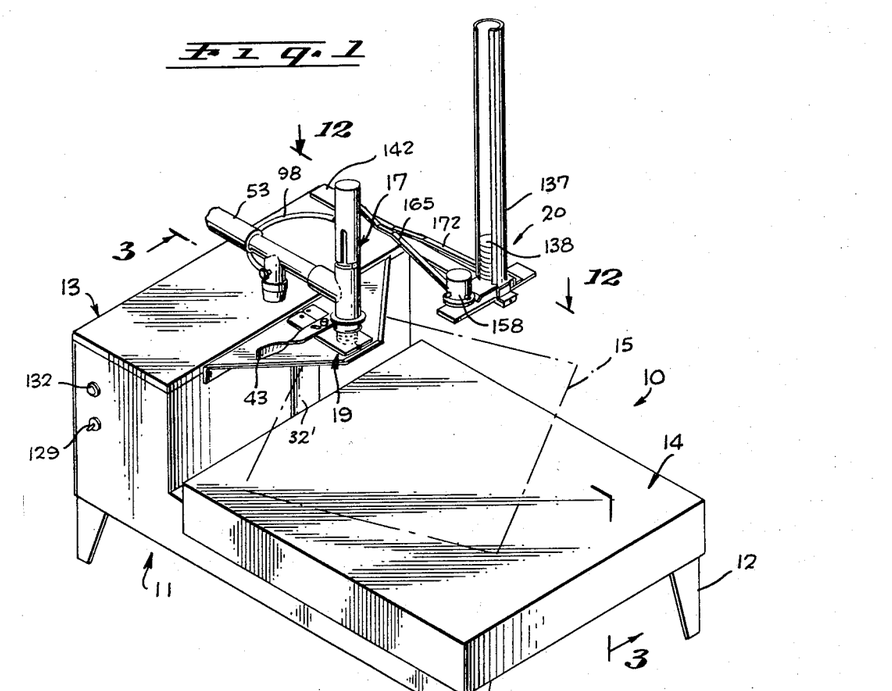
FIG. 1 is a perspective view showing a bag filling machine constructed in accordance with the invention.
Figure 2:
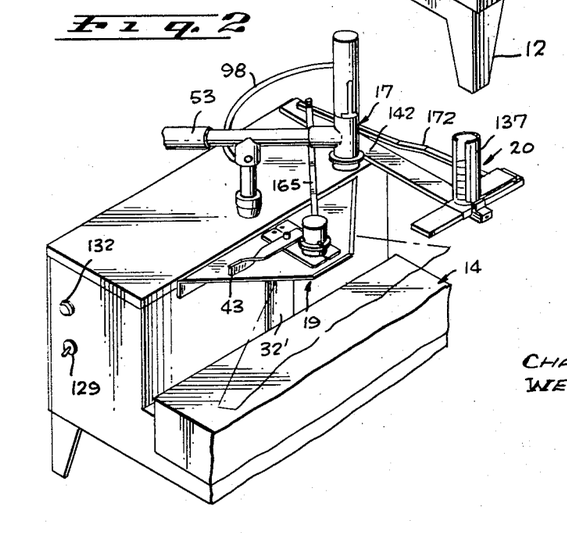
FIG. 2 is a fragmentary perspective view similar to FIG. 1, but showing the apparatus in its cap applying position.

Referring first to FIG. 1, I have shown at 10 a bag filling machine constructed in accordance with the invention, and having a main stationary housing 11 supported on suitable legs 12. The housing has an upstanding portion 13 at the rear of the machine, which contains certain of the pneumatic, electrical, and other parts of the apparatus. In front of this upstanding portion 13 of the housing, there is provided a platform 14 on which a bag 15 to be filled is located during the filling operation. Platform 14 is supported movably by a weighing scale 16 (see FIG. 3), which responds to the attainment of a predetermined bag weight to automatically close off the admission of milk into bag 15 through a filling valve unit 17. This unit 17 is mounted to swing between the active position of FIG. 1 and retracted position of FIG. 2, to coact with the inlet fitting or neck 18 of the bag (FIG. 3) which is held at a predetermined filling location by a holding assembly 19. After the filling operation has been completed, capping mechanism 20 may be actuated to apply a closure cap to neck 18 to complete the filling and closing operation.

Figure 3:
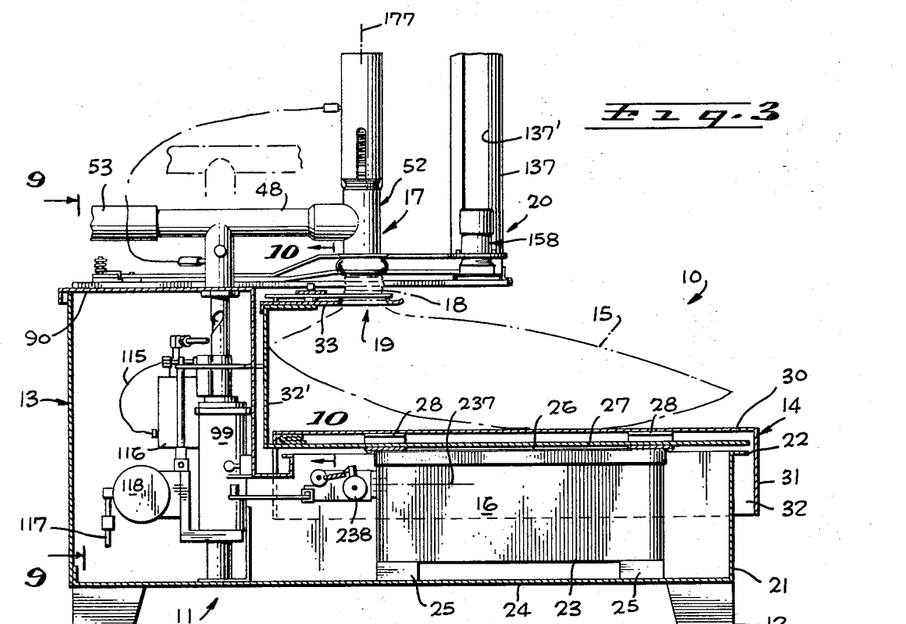
FIG. 3 is a vertical section taken primarily on line 3—3 of FIG. 1.
Figure 4:
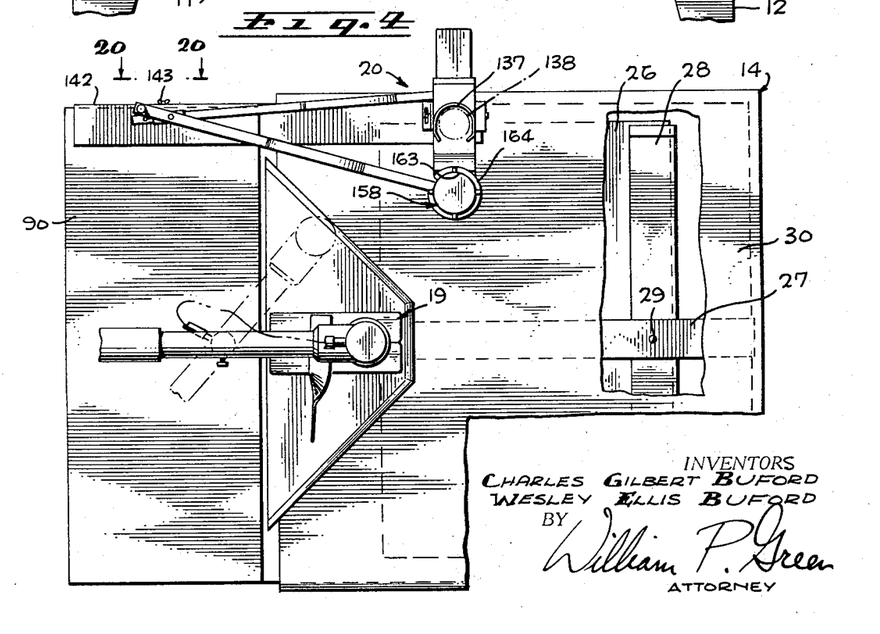
FIG. 4 is a fragmentary plan view, partially broken away, of the FIG. 3 apparatus.

As seen best in FIG. 3, the side walls 21 which define the forward lower portion of housing 11 terminate upwardly at a location 22, along the front and opposite sides of the forward portion of the housing. Scale 16 is located within this forward portion of the housing, and has a stationary body portion 23 which is suitably secured in fixed position relative to bottom wall 24 of the housing, as by fastening legs 25 of the scale to wall 24. At its upper side, weighing scale 16 has a top work supporting element 26 forming an inner platform, to which an elongated element 27 extending in a front to rear direction, and two or more transverse elements 28 extending from side to side, are rigidly secured, as by fasteners represented at 29 in FIG. 4. The top platform 14 on which bag 15 is directly positioned rests on transverse elements 28, and may have a horizontal work engaging portion 30 and depending skirts 31 and 32 extending along its front and two opposite sides of the housing. This entire platform 14 is thus supported on element 26 to move up and down therewith in weighing the bag 15 and its contents.

Holding structure 19, for holding the filling neck of bag 15, is supported by the previously mentioned part 27 (FIGS. 3 and 4) for up and down movement with the weighing platform 14. For this purpose, part 27 may have an upwardly projecting portion 32' adjacent the upstanding portion 13 of housing 11. At its upper end, portion 32' carries a forwardly projecting horizontal sheet metal part 33 to which gripping structure 19 is mounted. Element 33 contains near its forward edge a circular opening 34, about which the metal of part 33 may be turned slightly upwardly, annularly, as indicated at 35 in FIG. 5. The filling neck 18 of the bag is tubular, and of an external diameter to pass upwardly through opening 34 and be confined relatively closely therein, with an upwardly projecting externally threaded portion 36 of neck 18 extending upwardly above the level of the gripping apparatus 19.

4

Figures 11, 12, 20:
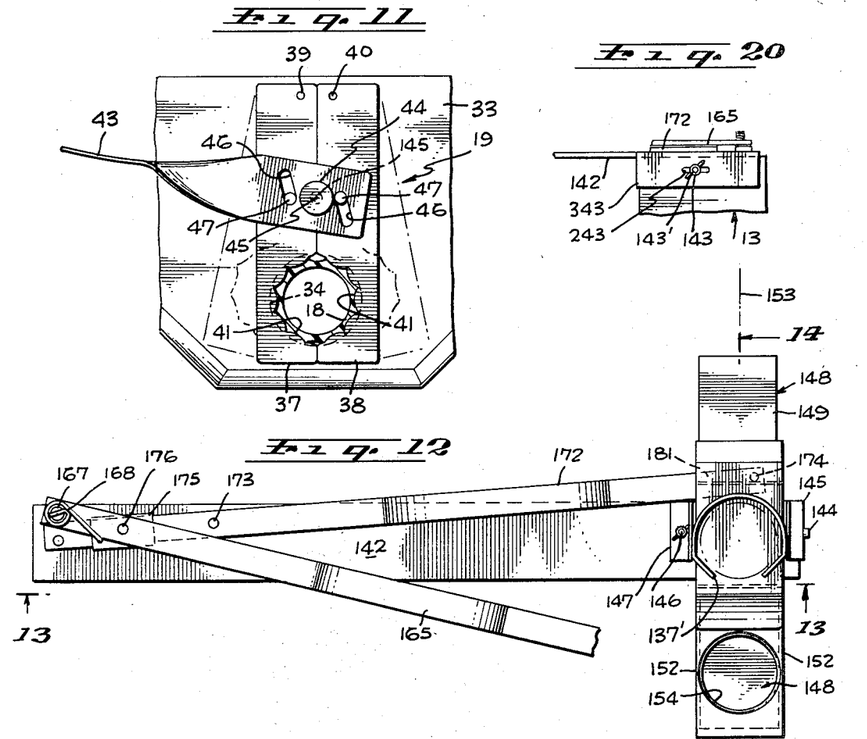
FIG. 11 is a reduced fragmentary plan view taken on line 11—11 of FIG. 10.
FIG. 12 is a fragmentary view taken on line 12—12 of FIG. 1.
FIG. 20 is a view on line 20—20 of FIG. 4.

The gripping structure includes two jaws 37 and 38 (FIG. 11), which are individually pivoted at 39 and 40 to part 33 for horizontal swinging movement toward and away from one another between the full line gripping positions of FIG. 11 and the broken line open positions of that figure. In the full line positions, portions 41 of the jaws which are shaped noncircularly in correspondence with the lower portion 42 of filling neck 18 (FIG. 5) tightly grip that filling neck to accurately locate it in a desired filling position, and hold it against removal from that position. The jaws 37 and 38 are actuable by a manually operated lever 43 (FIG. 11), which is provided by a screw 145 for pivotal movement about a vertical axis 45, with parts 37 and 38 being cut away at the location of screw 145 to pass the screw upwardly from plate 33 by which it may be rigidly carried. A nut 44 is removably threaded onto screw 145, and engages the upper surface of level 43 to hold the parts in assembled positions. Element 43 has two space parallel slots 46 shaped as shown in FIG. 1, and receiving camming pins 47 rigidly attached to parts 37 and 38, to cam jaws 37 and 38 toward and away from one another in response to swinging movement of lever 43.

The filling valve unit 17 includes a T-shaped body 52 having a horizontal tubular portion 48 (FIG. 5), containing a passage 49 communicating with a vertical cylindrical passage 50 formed in a vertically extending tubular forward portion 51 of body 52. Passage 49 is open at its rear end, and connected to an inlet hose 53 through which milk to be dispensed is admitted to body 52 from an appropriate supply source, typically a tank at an elevation high enough above body 52 to cause gravity flow into and through that body. Front passage 50 may be directly vertical and open downwardly into a flexible annular seal element 54, desirably formed of rubber or other resilient material. Part 54 may be bonded to a carrier ring 55, which with part 54 is frictionally retainable on a lower reduced dimension portion 56 of body 52. Ring 55 may have an edge 57 forming a trough for receiving any materials which may fall downwardly thereonto, and having a down turned portion 58 at a localized rear portion of part 55, to discharge those materials if any downwardly at that location.

Part 54 may be relatively thick at the top, and thin progressively as it curves downwardly and inwardly to form a very flexible lip 59 dimensioned to annularly engage the upper annular surface 60 of the part 18, about opening 61 within part 54 and about the fluid passage through part 18. The resilience of lip 59 is such as to avoid the exertion of any substantial downward force by that part against inlet neck 18, which force might introduce an inaccuracy into the operation of the scale.

Figures 5, 6, 6A, 7, 8:
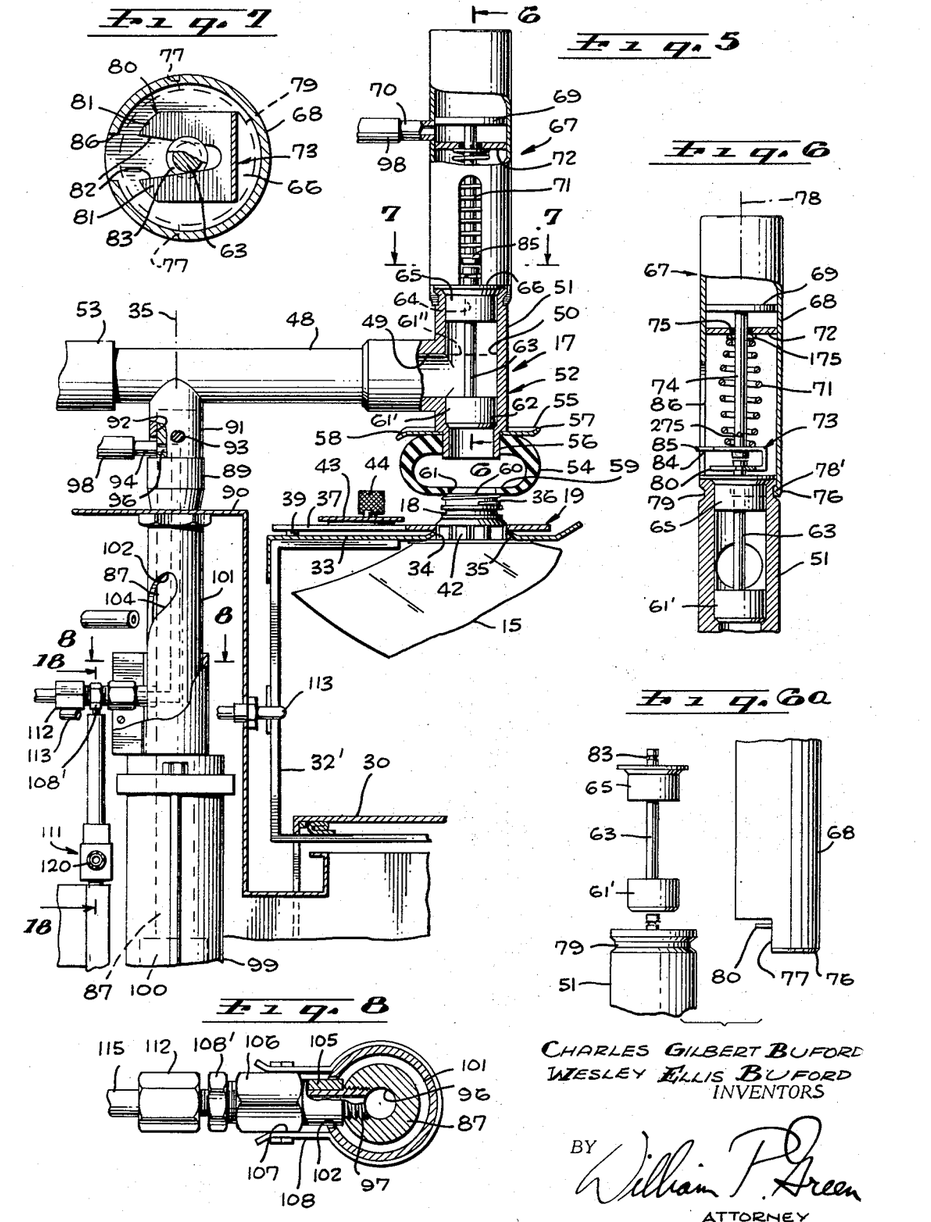
FIG. 5 is an enlarged view taken primarily in the plane of FIG. 3, with certain portions of the apparatus broken away to illustrate their interior construction.
FIG. 6 is a transverse vertical section taken primarily on line 6—6 of FIG. 5.
FIG. 6a is a view showing the two units of FIG. 6 after separation.
FIG. 7 is an enlarged horizontal section taken on line 7—7 of FIG. 6.
FIG. 8 is an enlarged horizontal section taken on line 8—8 of FIG. 5.

The discharge of milk from passage 50 is controlled by a valve element 61' which may be a cylindrical rubber element fitting tightly within passage 50, but movable upwardly and downwardly therein between the full line closed position of FIG. 5, and an elevated broken line position designated 61" in that figure. In its lower position, valve element 61' engages downwardly against an annular seat shoulder 62 formed in and by portion 51 of body 52. Element 61' is carried by a vertically extending shaft 63, typically formed of metal, and which passes through and is a tight fit within a passage 64 formed in a seal or gasket element 65 fitting closely within passage 50. Seal element 65 may be bonded to a metal disc 66 which engages downwardly against the upper end of portion 51 of body 52. As will be understood, the annular engagement of rubber seal element 65 with body 52 and shaft 63 prevents any upward flow of milk from body 52.

The valve is operated by an actuating unit 67, which preferably takes the form of a piston and cylinder mechanism whose vertically extending cylinder is represented at 68, and whose contained vertically movable piston is shown at 69. Actuating air is introduced into the cylinder at the underside of piston 69 through an inlet 70 (FIG. 5) to actuate the piston upwardly against the influence of a compression spring 71 acting upwardly against a wall 72 rigidly carried by the cylinder. The lower end of spring 71 bears downwardly against a part 73 which is rigidly attached to tubular piston rod 74. Wall 72 contains an appropriate O-ring seal element 75 held in place by spring 71 and a fibre washer 175, and forming an annular seal with the shaft or piston rod 74 to prevent leakage therepast. Air from above piston 69 may be vented to atmosphere through the interior of piston rod 74, and through a vent opening 275 leading therefrom to atmosphere.

The lower end of cylinder 68 has a terminal portion 76 which is cut away at 77 to extend only partially about the main vertical axis 78 of piston 69 and valve element 61. This portion 76 extends about the outside of the upper extremity of portion 51 of body 52, and has an arcuate inwardly extending projection or shoulder 78' disposed about axis 71 and receivable within an annular groove 79 formed in the outer surface of body 52. This groove and projection 78' lie in a horizontal plane. Preferably, portion 76 and its projection 78 extend about portion 51 of body 52 through slightly more than 180 degrees, relative to axis 78, so that portion 76 must be forced into groove 79, and must be expanded slightly during such connection of the parts together. More particularly, the cylinder body 68 is connected to body 52 by moving body 68 leftwardly from the position of FIG. 6a to the position of FIG 6, during which movement shoulder 78' of portion 76 of body 68 slides horizontally into groove 79, transversely of axis 78, to the FIG. 6 assembled condition, in which the parts are retained by virtue of the slightly more than 180 degrees encirclement of the groove by portion 76. The parts may subsequently be separated by forcing portion 78' out of groove 79. The metal of cylinder body 68 must of course have sufficient slight resilience to enable this frictional locking engagement between parts 68 and 52.

The same movement between the positions of FIGS. 6a and 6 acts to connect part 73 to valve stem 63 for actuation thereof. For this purpose, part 73 has a horizontally extending portion 80 having the bifurcated shape illustrated in FIG. 7, to form two fingers or arms 81 having diverging edges 82 receivable within an annular groove 83 formed in valve stem 63 above plate 66. As the cylinder housing 68 is moved to the left from the FIG. 6a position to the FIG. 6 position, fingers 81 are received within the opposite sides of groove 83, and act to interfit with that groove in the FIG. 7 condition in which upward and downward movement of piston 69 is effectively transmitted to the valve 61' to open and close it. In order to maintain fingers 81 in proper orientation with respect to portion 76 of the cylinder housing, so that the same leftward movement will interconnect the piston and valve, and also the two housing parts 68 and 52, element 73 has an upper portion 84 which is connected rigidly to stem 74, and also has a tab 85 projecting into a vertical slot 86 formed in cylinder wall 68, to always key part 73 against turning movement about axis 78 relative to cylinder housing 68.

Figure 9:
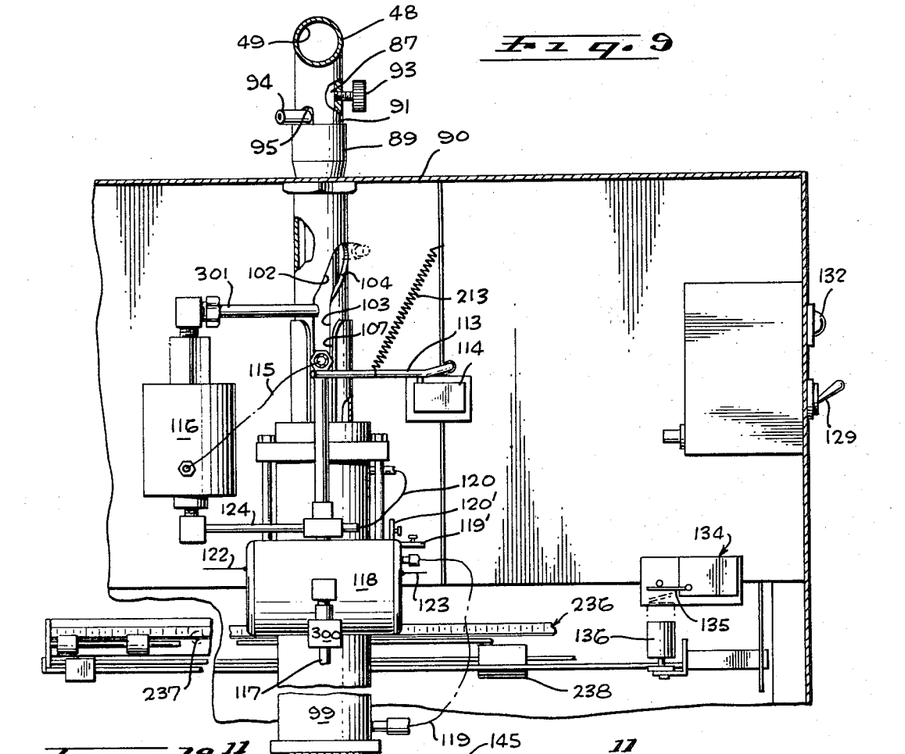
FIG. 9 is a fragmentary enlarged vertical section taken on line 9—9 of FIG. 3.

As seen best in FIGS. 5 and 9, valve body 52 is rigidly mounted to a vertically extending shaft 87 for vertical movement therewith along a vertical axis 88, and for swinging movement with the shaft about that axis. Shaft 87 may be formed of a rigid metal, and projects upwardly through a bushing element 89 which is rigidly attached to top wall 90 of the housing, and which journals and guides shaft 87 for the desired axial and rotary movement. A part 91 is rigidly brazed to body 52, and projects downwardly therefrom (FIG. 5), and contains a cylindrical recess 92 into which the upper end of externally cylindrical shaft 87 projects. One or more set screws 93 (FIG. 9) extend through the side wall of element 91 and are tightenable against the upper end of shaft 87 to secure body 52 removably to the shaft. The part 52 is located in fixed rotary position relative to the shaft by extension of a rigid air outlet tube 94 carried by shaft 87 through a locating notch 95 formed in the side wall of part 91. As will be apparent from FIG. 5, the tube 94 communicates with a passage 96 in shaft 87, which passage extends downwardly through the shaft and communicates at its lower end with another tube 97 rigidly connected into shaft 87 and projecting rearwardly therefrom. Air is conducted from tube 94 to the inlet fitting 70 of piston and cylinder mechanism 67 through a flexible hose 98.

Shaft 87 is actuable upwardly and downwardly by a piston and cylinder mechanism 99 (FIG. 5), whose cylinder is fixed stationarily within the housing, and whose piston 100 is movable vertically along axis 88. Shaft 87 is attached to piston 100 to be moved upwardly and downwardly thereby.

Shaft 87 is surrounded by a vertical tube 101, centered about axis 35, which tube contains a cam slot 102 having a vertical lower portion 103 (FIG. 9), and a helically extending upper portion 104. The previously mentioned air supply tube 97 which is connected into the lower portion of shaft 87 (FIG. 5) has disposed about it an internally and externally cylindrical bearing sleeve 105, having an external diameter corresponding approximately to the width of cam slot 102, to be guided thereby and turn shaft 87 as sleeve 105 moves upwardly or downwardly within the helical portion 104 of cam slot 102. Outwardly beyond sleeve 105, tube 97 connects to a fitting 106 which is receivable slidably within a vertical guideway 107 formed within a part 108 connected to tube 101, to assist in guiding shaft 87 and tube 97 for only vertical movement when the tube is within the lower vertical portion 103 of guide slot 102. Tubular fitting 106 is connected to another tubular air conducting fitting 108', which is engageable with a vertically movable actuating element 110 of a bleed valve assembly 111, to actuate its valve element 110' to closed position as shaft 87 approaches its lowermost position of FIG. 5. Fitting 108' is connected to another fitting 112 which, in the lowermost position of FIG. 5, actuates a swinging arm 113 (FIGS. 5 and 9), which operates a microswitch 114. Air is supplied to fitting 112 through a flexible hose or tube 115, whose opposite end is connected to an air controlling solenoid valve 116.

Figure 17:
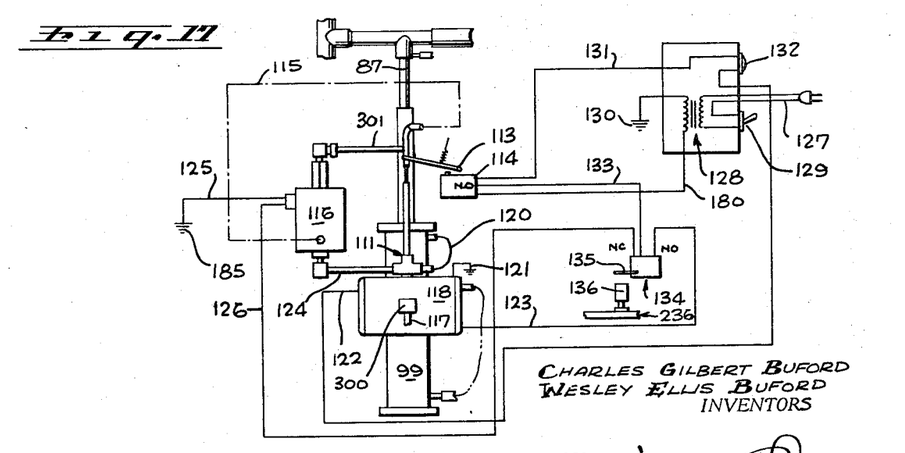
FIG. 17 is a diagrammatic representation of the electrical and pneumatic control apparatus.

The main compressed air inlet to the apparatus is illustrated at 117 in FIGS. 3, 9 and 17. This line connects into an electric pilot valve 118, containing a solenoid which is operable to selectively admit compressed air from line 117 into a line 119 going to the bottom end of cylinder 99 or a line 120 connecting into the upper end of the cylinder. The solenoid is connected to ground at 121, and can be supplied with signals from either of two input leads 122 and 123. If current is supplied to valve unit 118 through leads 121 and 122, the valve is actuated to admit air from line 117 through line 120 into the upper end of cylinder 99, to move its piston and shaft 87 downwardly, while line 119 discharges to atmosphere through an adjustable bleed outlet 119'. Similarly, current supplied to leads 121 and 123 actuates the valve 118 reversely to admit air to the lower end of the cylinder, through line 119, to actuate its piston and shaft 87 upwardly, while line 120 discharges to atmosphere through an adjustable outlet 120'. Line 120 communicates with the previously mentioned bleed valve assembly 111, and is also in communication with a line 124 leading to the inlet side of the solenoid valve 116. When solenoid valve 116 is supplied with air through line 124, and is then energized through leads 125 and 126 (FIG. 17), it passes air from line 124 through the valve to line 115 (FIGS. 3, 9 and 17) to shaft 87.

Current is supplied to the circuit diagram of FIG. 17 through a power line 127, connected to the primary side of a transformer 128, under the control of a main power switch 129. The secondary of the transformer is connected to ground at 130, and to a common side of microswitch 114. A normally closed side of this microswitch is connected through a lead 131 to a push button start switch 132, whose opposite side is connected to lead 122 to valve 118. A normally opened contact of microswitch 114 is connected through a lead 133 to the common side of a scale operated switch 134. The normally opened contact of this switch is connected to lead 123, while the normally closed contact of switch 134 is connected to lead 126. Switch 134 is actuated magnetically from its normal condition to the opposite condition by movement of an actuating lever 135 of the switch when the scale responds to the attainment of the predetermined desired weight of fluid in bag 15. More particularly, arm 135 may be formed of a magnetic material, and may be actuable downwardly when a magnet 136 carried by conventional balance arm 236 of the scale moves upwardly upon the attainment of a desired weight (FIG. 9). Balance arm 236 may be pivoted to body 23 of the scale for swinging movement about an axis 237 (FIGS. 3 and 9), with the critical weight being settable by shifting movement of one or more scale arm weights 238.

Figure 15:
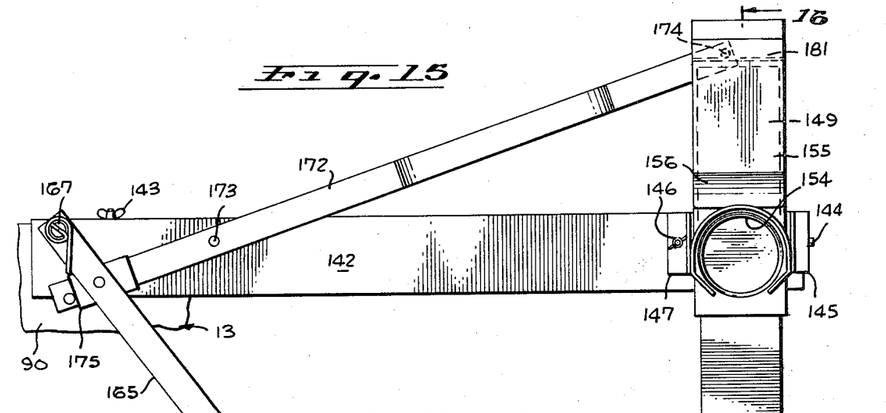
FIG. 15 is a view showing the capping mechanism in its cap applying position.
Figure 21:
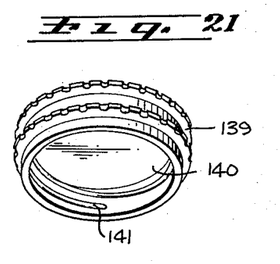
FIG. 21 is a perspective view of the cap.

The cap applying mechanism 20 of FIG. 1 includes a vertically extending tubular magazine 137 having an internal diameter corresponding approximately to the external diameter of the circular caps 138 to be applied to bags 15. These caps are stacked within magazine 137 as shown in FIG. 1, and may be shaped as illustrated in FIG. 21, having generally cylindrical side walls 139 closed at their upper sides by top walls 140, and containing internal threads 141 for engaging the threads of fitting 18 of the bag. The caps are positioned in magazine 137 with their inner threaded recesses facing downwardly. The lower end of the magazine is secured rigidly to an elongated mounting member 142, which extends outwardly from one side of the rear portion 13 of housing 11, and which is detachably secured thereto by a wing nut 143 (FIGS. 15 and 20). Element 142 takes the form of a flat horizontal metal member received on the upper surface of housing 11 (FIG. 13), and having a pin 144 at one of its ends projecting horizontally through a mating aperture in a vertical mounting portion 145 of the magazine, and coacting with a screw 146 passing vertically through a horizontal second mounting portion 147 of the magazine to securely but removably attach the magazine to member 142. The mounting portions 145 and 147 of the magazine may be formed integrally with the magazine or may be separate sheet metal elements welded to and projecting downwardly from two opposite sides of the magazine. Along one of its sides, magazine 137 may have a vertical slit or opening 137' of a size smaller than the caps, to allow access to the interior of the magazine but effectively retain the caps therein.

Figure 16:
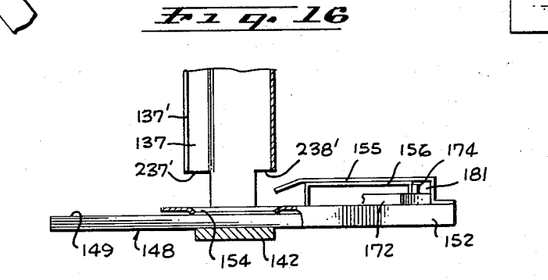
FIG. 16 is a section on line 16—16 of FIG. 15.

Rigidly secured to the outer end of member 142 is a cap supporting element 148, taking the form of a rigid metal plate of the configuration shown, and having an upper horizontal surface 149 (FIG. 14) on which the lowermost one of the caps 138 is supported. Slidably connected to element 148, at its upper side, is a feed structure 150, including a strip of sheet metal 151 extending across and along the upper surface of element 148. This part 151 has guide flanges 152 extending downwardly at opposite sides of element 148 (FIGS. 13 and 14), and guiding plate 151 for horizontal sliding movement between the retracted position of FIG. 16 and the displaced position of FIG. 14. This movement is in a leftward and rightward direction in FIGS. 14 and 16, and is in the direction indicated by the axis 153 in FIG. 12. Plate 151 contains a circular opening 154 of a diameter to receive and locate the lowermost one of the caps 138, and acting to shift that cap leftwardly from the FIG. 16 position at the bottom of the magazine to the leftwardly displaced FIG. 14 position. Above plate 151, the structure 150 includes an upper sheet metal element 155 having a slightly down turned leading portion 156, and supported in spaced relation to plate 151 by a support member 157. When the structure 150 shifts to the left, the leading portion 156 of element 157 is received beneath the next to bottom one of the caps 138, and supports that cap against downward movement while the lowermost cap is being shifted leftwardly to the FIG. 14 position, and until the entire structure 150 returns to the right far enough for opening 154 to be received beneath and accept the next successive cap. Thus, structure 150 acts upon each reciprocation to shift the lowermost cap from the magazine to the FIG. 14 position. The lower end of the magazine is cut away at its left and right sides (as viewed in FIGS. 14 and 16), to pass the sliding structure 150, but at a level low enough to provide lower edge portions 237' and 238' which are low enough to engage the next to bottom cap in the magazine, and prevent it from being shifted laterally with structure 150 and the lowermost cap.

Figure 13:
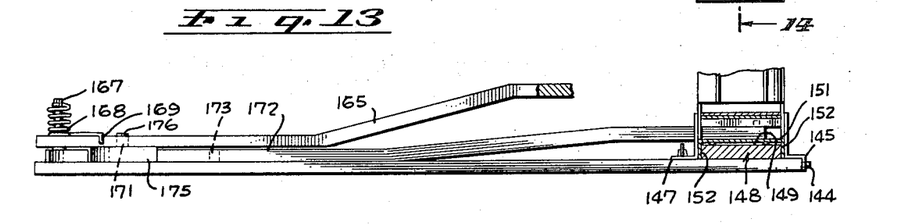
FIG. 13 is a fragmentary vertical section taken essentially on line 13—13 of FIG. 12.
Figure 14:
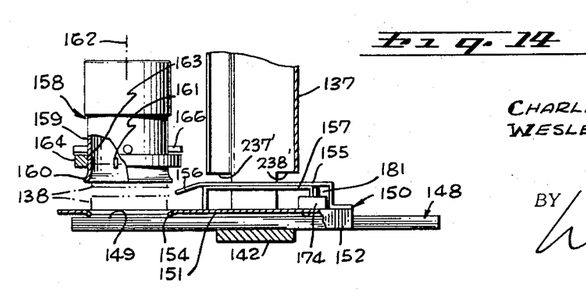
FIG. 14 is an enlarged fragmentary vertical section taken primarily on line 14—14 of FIG. 12.

The shifted cap is taken from the FIG. 14 pick-up position by means of a carrier 158 which may be formed as a simple cylindrical metal part 159 having a slightly flaring lower end 160 which can move downwardly about a cap 138, so that the cap extends upwardly into the cylindrical portion 159 of the element, and is frictionally retained therein. This part may have one or more small lugs projecting radially inwardly from its inner surface, as at 161, to engage irregularities on the periphery of the cap in a manner keying the cap to carrier 158 for rotation therewith. Carrier 158 is mounted for rotation about a vertical axis 162 by extension through and confinement within a circular opening 163 formed in an annular end portion 164 of a mounting arm 165. Lugs or pins 166 may project outwardly from side wall 159 of the carrier at circularly spaced locations, to engage the upper side of portion 164 of the arm in a manner supporting the carrier 158 against movement downwardly relative to the arm any farther than the FIG. 14 position. However, the arm itself is free for downward movement, with corresponding movement of carrier 158, far enough to contact plate 151, and effectively engage and pick up a cap 138 carried within opening 154. To enable this downward movement of arm 165, the arm is pivotally mounted to a pin 167 projecting upwardly from part 142 (see FIGS. 12, 13 and 15), and is yieldingly urged downwardly relative to pin 167 by a coiled spring 168. This spring 168 has one end fastened to the upper end of pin 167, and has its opposite end turned into engagement at 169 with one side of arm 165 (FIGS. 12 and 13), to yieldingly urge arm 165 from its FIG. 15 position to its FIG. 12 position about axis 167. Spring 168 also urges the arm downwardly at the location of pin 167, and about a location 171 as a fulcrum point, to normally retain the end portion 164 of arm 165 in the FIG. 14 position, while allowing that portion to be deflected downwardly manually into engagement with plate 151 against the tendency of spring 168.

A second elongated arm 172 is provided for automatically actuating the cap feeding plate 151, and for this purpose, arm 172 is pivoted to member 142 at 173. This arm is also pivotally connected at 174 to plate 151, and slidably carries a member 175, which is received about arm 172 and slidable therealong. Member 175 carries an upwardly projecting pin 176 which extends through an opening in the other arm 165 to pivotally connect member 175 thereto, with the result that when member 165 is manually swung between its FIG. 12 and FIG. 15 positions, the part 175 acts to simultaneously swing arm 172 in the opposite direction from its FIG. 12 position to its FIG. 15 position. Also, as will be apparent from FIG. 13, the engagement of arm 165 with member 175 allows for the discussed fulcruming movement about point 171 of FIG. 13, to lower carrier 158 into engagement with a cap. During this fulcruming movement, the sliding member 175 itself may swing slightly with arm 165, and for this purpose may engage only the top and opposite sides of member 172, and not its underside.

To now describe the operation of the discussed apparatus, assume first of all that the scale has been properly set for a particular desired bag weight, and caps have been inserted in magazine 137. Initially, cap carrier 158 is in its retracted position of FIG. 1, and the filling valve assembly 17 is in its retracted position of FIG. 2. With the parts thus retracted, lever 43 of FIG. 11 is actuated to open jaws 37 and 38, so that an empty bag 15 may have its inlet fitting 18 clamped in the jaws, with the bag extending forwardly on platform 14 as shown in FIG. 1. After the filling fitting of the cap has been thus clamped by the jaws of holder 19, with the filling neck 18 extending vertically about axis 177 of FIG. 3, the operator presses start button 132 of FIG. 17 to place the apparatus in operation. Such closure of switch 132 closes an energizing circuit from the secondary of transformer 128 through lead 180 to the common contact of switch 114, then through the normally closed contact of that switch to lead 131, then through switch 132 and lead 122 to a first side of electrically operated valve 118, whose opposite side is permanently connected to the other side of the secondary of transformer 128 through ground connections 121 and 130. Such energization of valve 118 causes that valve to admit air from inlet 117 to line 120 leading to the upper side of cylinder 99. The resultant admission of air to the upper end of this cylinder causes downward movement of the contained piston 100, and the connected upwardly projecting shaft 87. As the shaft moves downwardly, it is caused to also turn in a clockwise direction as viewed from the top of the apparatus, by virtue of the movement of cam roller 105 along the helical upper portion 104 of cam slot 102 (FIG. 9). This turning movement of shaft 87 is just sufficient to swing the carried body 52 (FIG. 5) forwardly and leftwardly from the FIG. 2 position to the FIG. 3 position. Thus, when roller 105 has reached the beginning or uppermost extremity of the vertical portion 103 of slot 102, element 54 is then directly above and in vertical alignment with filling neck 18 of the bag. Further and continued downward movement of shaft 87 by the connected piston 100 causes the shaft and its carried parts, including flexible nozzle element 54, to move directly downwardly, without turning or swinging movement, so that the lower lip 59 of part 54 lightly engages and forms an annular seal with the upper surface of neck 18. This sealed relation is attained as the shaft 87 and carried parts reach their lowermost position of FIG. 5. The final portion of the downward movement, just as the seal with the filling neck is formed, also swings arm 113 of FIG. 9 downwardly, by engagement with fitting 112 carried by shaft 87, and against the tendency of a return spring 213, to actuate microswitch 114 to open its normally closed contact and close its normally open contact. This actuation of the microswitch closes a circuit to solenoid valve 116, to admit air through that solenoid valve and line 115 into the interior of shaft 87. The air for this purpose is supplied to line 124 through its communication with line 120 and fitting 111. The defined circuit to solenoid valve 116 is completed from the secondary of transformer 128 through lead 180, the normally open contact of switch 114, lead 133, the common contact of switch 134, the normally closed contact of that switch, and lead 126, with the second side of solenoid valve 116 being connected to ground through lead 125 and the grounding connection represented at 185. The air from solenoid valve 116 and line 115 enters shaft 87 through fitting 112, 108', 106 and 97 of FIG. 5, then flows upwardly through passage 96 in the shaft, and outwardly through tube 94 and hose 98 to enter cylinder body 68 beneath piston 69. This actuating air forces piston 69 upwardly, to correspondingly move valve element 61 upwardly away from its seat 62 and to the broken line position 61″ of FIG. 5, to allow milk to flow through horizontal passage 49 and downwardly through vertical passage 50 of part 52, and to discharge through element 54 into the bag. This filling operation continues until the weight of the filled liquid reaches a predetermined value, representing the amount of liquid which is to be metered into the bag, at which time the weight on platform 14 moves element 26 of scale 16 downwardly just sufficiently to swing balance arm 28 of the scale upwardly to a position indicating that the preset weight has been attained. This upward movement of arm 28 and its carried magnet 136 (FIGS. 9 and 17) magnetically actuates switch 134 to stop the filling operation. This is effected by closing a circuit to the second side of electrically operated valve 118 as follows: from the secondary of transformer 128 through lead 180, the normally opened contact of switch 114, lead 133, the common and normally open contacts of switch 134, and lead 123 connecting into the right side of electrically operated valve 118. The second side of the valve is of course grounded. At this point, it may be stated that valve 118 is of a type acting to automatically remain in whichever of its two positions it has last been actuated to. Consequently, even though the initial circuit through lead 122 is broken almost immediately after closure of the actuating switch 132, the valve 118 will nevertheless be actuated to its filling position when switch 132 is closed, and will remain in that position until the just discussed circuit through scale operated switch 134 is closed to lead 123. When this circuit is closed, the valve 118 is returned to its initial condition, to admit air to the lower end of cylinder 99 through line 119, and relieve the pressure from the upper end of cylinder 99 so that the piston 100 within that cylinder is actuated upwardly, to move shaft 87 and its carried parts upwardly. The first portion of this movement is directly vertical, and the last portion combines rotary or swinging movement with the vertical movement, as bearing sleeve or roller 105 of FIG. 9 passes along the upper helical portion 104 of slot 102. Thus, filling valve 17 is retracted upwardly and laterally to its initial FIG. 2 position. Also, the magnetic actuation of switch 134 opens the normally closed contact of that switch to break the circuit to valve 116, and thereby close off that valve, and the flow of milk from valve 17.

Figures 10, 18:
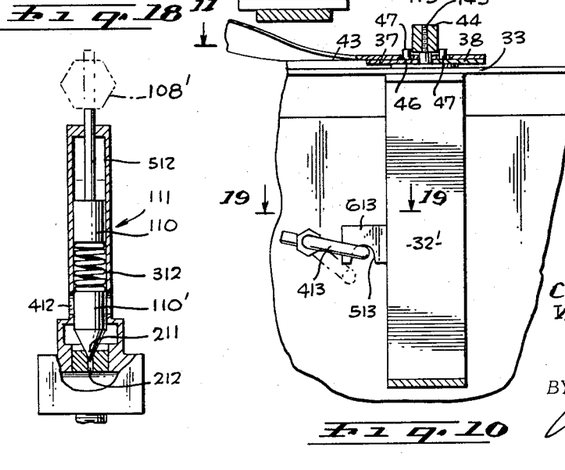
FIG. 10 is a greatly enlarged fragmentary vertical section taken on line 10—10 of FIG. 3.
FIG. 18 is a section on line 18—18 of FIG. 5.

When valve 118 is actuated to the above discussed condition for admitting air to the lower end of cylinder 99 through line 119, such actuation of the valve also serves to simultaneously connect line 120 from the upper end of the cylinder to outlet 120', to release the pressure at the upper end of the cylinder to atmosphere. However, outlet 120' is adjusted to a restricted condition in which it releases the pressure only very slowly, and thus allows only very slow upward movement of piston 100, shaft 87 and dispensing unit 17. After these parts have moved upwardly a predetermined distance, preferably to the point at which cam slot 102 commences the lateral swinging movement of unit 17, the bleed valve 111 suddenly opens automatically to allow discharge of air from line 120 much more rapidly than had theretofore been possible, so that the unit 17 completes its upward and lateral travel at a greatly increased rate. Valve element 110' is, in the FIGS. 5 and 18 condition of the apparatus, held downwardly against its seat 212 by a compression spring 312 interposed between elements 110 and 110'. As parts 109 and 110 commence their upward movement, the spring 312 continues to hold element 110' closed, but with reduced force, until ultimately, as unit 17 commences its lateral swinging motion, valve element 110 suddenly pops open to release air to atmosphere through passages 212' and 412, which in the open position of element 110' are much less restricted to air discharge than is outlet 120'. The purpose of the initial period of slow upward movement of shaft 87 is to allow ample time for any excess milk in unit 17 to drip from that unit into the bag, during such slow directly vertical movement of unit 17, and prior to the more rapid lateral retraction of that unit. The downward movement of unit 17, on the other hand, may be rapid throughout that downward travel, and for this purpose outlet 119', through which air from line 119 and the lower end of cylinder 99 discharges upon downward movement, may be much less restricted than outlet 120' and typically as unrestricted as the passages 212' and 412 in their open condition. Any leakage of air through valve 111 during the downward movement of unit 17 is insufficient to substantially reduce the actuating pressure above piston 100.

After the above discussed filling operation, a cap is applied to the filling neck 18 of the bag by manual actuation of carrier 158. More particularly, this carrier which is normally retained in the retracted position of FIG. 14 by spring 168 of FIG. 13, is pressed downwardly to engage, surround and frictionally retain and lift a cap which is positioned directly therebeneath within opening 154 of FIG. 14. Carrier 158 is then allowed to return upwardly under the influence of spring 168, and is manually swung from the FIG. 1 position to the FIG. 2 position directly above filling neck 18. Carrier 158 is then again pressed downwardly, so that the carried cap surrounds neck 118, following which carrier 158 is turned in a clockwise direction to screw the cap onto neck 118 in closing and sealing relation. The carrier 158 is then released for automatic return to the FIG. 1 position, and jaws 37 and 38 may be opened to enable removal of the filled and closed bag and positioning of a next successive bag for filling.

When it is desired to clean the apparatus, this may be effected very easily and rapidly by virtue of the unique construction of the milk contacting portions of the machine. More particularly, the body 52 through which milk is dispensed may be detached by merely loosening the screw 93 of FIG. 9, and then lifting portion 91 of body 52 upwardly away from shaft 87. This body 52 may be detached from the piston and cylinder actuating unit 67 by leftward movement of unit 67 from the FIG. 6 position to the FIG. 6a position, as has been discussed previously. After such quick detachment of part 52 from shaft 87 and unit 67, valve 61 then may be pushed upwardly through and from portion 61 of the T-shaped body 52, to leave the two intersecting passages in that body very open for thorough cleansing. The removed valve 61 and its connected shaft 63 and associated seal element 65 may also be cleaned thoroughly and reassembled with the other parts. Similarly, element 54 and its connected part 55 may be pulled off of the lower end of body 52, to which they are merely frictionally secured by engagement of the rubber of part 54 with body 52, and after cleansing may be replaced. Magazine 137 may be detached by merely unscrewing the single fastener 146 as has been discussed before, after which plate 151 and its attached parts may be removed for cleaning and to expose part 148 for cleaning. In this connection, it is noted that the pivot pin 174 of arm 172 is not connected directly into an opening in the structure 150, but is merely confined within a front to rear guideway 181 (FIG. 14), from which it may slip when part 151 is lifted off of element 148. Even member 142 of FIG. 15 can be removed for cleaning. With regard to the gripper mechanism 19, this may be separated into its component parts and detached by merely removing the nut 44, whose undersurface engages part 43, so that this part 43 is free for upward removal after detachment of the nut. The slots 46 are free for removal upwardly away from their mating pins 47, following which jaws 37 and 38 may be removed upwardly by movement off of their pins 38 and 40, which are secured to and project upwardly from plate 33. After cleaning, all these parts may be replaced to the condition illustrated in FIG. 11.

Desirably, all of the metal parts of the apparatus, including especially those parts which may contact milk, such as part 52, are formed of stainless steel, to avoid any adverse effect on the milk being handled or on the parts themselves.

The various air actuated parts may be internally lubricated by introducing atomized oil into the air stream through a conventional lubricator represented diagrammatically at 300 (FIG. 9). Also, the portion of this air which is discharged from valve 116 and the parts controlled thereby upon closure of valve 116 may be utilized to lubricate roller 105 and slot 102 (FIGS. 5 and 8) by directing such air from valve 116, with its contained lubricant, through a discharge line 301 onto the roller and slot.

Figure 19:
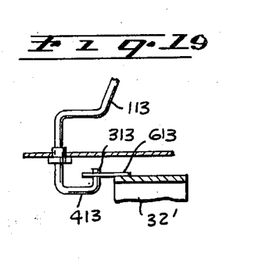
FIG. 19 is a section on line 19—19 of FIG. 10.

At all times when the scale is not actually being used for a milk weighing operation, the scale platform 30 and its connected parts may be locked against unwanted shifting movement, preferably by engagement of a turned portion 313 of a swinging arm 413 (FIGS. 10 and 19) upwardly within and against a notch 513 in a part 613 rigidly carried by element 32'. Arm 413 may be rigidly connected to the previously discussed switch actuating arm 113 (FIGS. 9 and 19), to swing about a horizontal axis therewith, and to be urged by spring 213 upwardly against notch 513 except when downward actuation of arm 113 to the FIG. 9 position correspondingly swings arm 413 to its broken line released position of FIG. 10, just as element 54 engages the bag in filling relation.

To allow easy adjustment of the capping structure relative to the housing, in order that a carried cap may be located precisely above the neck of a bag being filled, element 142 of the capping mechanism may be mounted adjustably to the housing. More particularly, element 142 may have a vertical flange 343 (FIGS. 15 and 20) received adjacent a side wall 11' of housing 11, with this side wall carrying a screw 143' projecting through an adjusting slot 243 in flange 343 and having the previously mentioned wing nut 143 removably connected to the screw to secure element 142 in place. Thus element 142 can be adjusted horizontally or longitudinally by shifting slot 243 relative to screw 143'.

The form of the invention shown in FIG. 1 and the other figures is designed for use in situations in which access to the machine can best be had from its left side. For this reason, the filling and capping parts swing to rightwardly retracted positions. However, it is of course contemplated that opposite-handed machines may be provided in which the capping mechanism is located at the left side of the machine, and both it and the filling unit 17 retract to the left.

I claim:
1. Fluid delivering apparatus comprising a first body structure having an outlet through which fluid is discharged and containing a passage leading to said outlet, a valve part carried by said body structure and movable relative thereto along a predetermined axis between an open position for passing fluid to the outlet and a closed position for preventing fluid flow to the outlet, a power operated unit including a second body structure and a movable valve actuating part which is carried by said second body structure and is displaceable by power relative thereto and is operable upon such displacement to shift said valve part along said axis between open and closed positions, one of said body structures being movable relative to the other body structure essentially transversely of said axis between an assembled active position in which said valve actuating part is positioned to move said valve part axially and a separated position in which the valve actuating part can no longer move said valve part and the body structures are separated from one another for cleaning, and a releasable connection between said valve part and said valve actuating part including interfitting means on said parts movable into and out of interfitting connected relation by said movement of said one body structure relative to the other body structure transversely of said axis.

2. Fluid delivering apparatus as recited in claim 1, including a second connection for detachably securing said two body structures together in said assembled active position.

3. Fluid delivering apparatus as recited in claim 1, including a second connection for detachably securing said two body structures together in said assembled active position, said second connection including interfitting means on said two body sections movable into and out of interfitting connected relation by the same transverse movement of said one body structure relative to the other which moves said interfitting means of the first mentioned connection into and out of interfitting relation.

4. Fluid delivering apparatus as recited in claim 1, in which said valve part is in said passage, and the latter is open for removal of the valve part from the first body structure when the body structures are in said separated position.

5. Fluid delivering apparatus as recited in claim 1, in which said second body structure includes a cylinder, and said actuating part is a piston reciprocable within said cylinder and along said axis.

6. Fluid delivering apparatus as recited in claim 1, in which said interfitting means include a structure carried by one of said parts and containing a groove disposed generally transversely of said axis, and a structure carried by the other of said parts and receivable slidably within said groove upon said transverse movement of one body structure relative to the other.

7. Fluid delivering apparatus as recited in claim 1, in which said second body structure includes a cylinder, and said actuating part is a piston reciprocable within said cylinder and along said axis, one of said parts having a shaft extending along said axis, said interfitting means including a groove formed in the outer surface of said shaft and about said axis, and a structure carried by the other of said parts and disposed generally transversely of said axis and containing a recess within which said shaft is received in said active position, said recess being defined by an inner edge of said last mentioned structure which is slidably received in said groove in said active position and is withdrawn from the groove in said separated position.

8. Fluid delivering apparatus as recited in claim 1, in which said valve part is located within said passage in the first body structure and has a shaft extending and movable along said axis and having an end portion projecting from said first body structure and containing a peripheral essentially annular groove, a seal element removably mounted in said first body structure and disposed about said shaft in sealing relation and beyond which said end portion projects, said second body structure including a cylinder, said actuating part being a piston reciprocable in the cylinder and having a piston rod aligned with and projecting into close proximity to said shaft of the valve part, a connector part carried by an end of said piston rod and which is of essentially U-shaped configuration having a first leg secured to said piston rod and having a second leg detachably connectible to said shaft of the valve part, said second leg being bifurcated to form a recess which detachably receives said end portion of the shaft and which is defined by an edge slidably received within opposite sides of said groove in connecting relation upon said tranverse movement of one body structure relative to the other.

9. Fluid delivering apparatus as received in claim 8, including a releasable second connection operable to detachably secure said two body structures together in said assembled active position.

10. Fluid delivering apparatus as recited in claim 1, in which said valve part is located within said passage in the first body structure and has a shaft extending and movable along said axis and having an end portion projecting from said first body structure and containing a peripheral essentially annular groove, a seal element removably mounted in said first body structure and disposed about said shaft in sealing relation and beyond which said end portion projects, said second body structure including a cylinder, said actuating part being a piston reciprocable in the cylinder and having a piston rod aligned with and projecting into close proximity to said shaft of the valve part, a connector part carried by an end of said piston rod and having a portion disposed generally transversely of said axis and containing a recess which detachably receives said end portion of the shaft and which is defined by edges slidably received within opposite sides of said groove in connecting relation upon said transverse movement of one body structure relative to the other, said body structures having interfitting walls disposed essentially about said axis one of which contains an arcuate groove within which an arcuate projection on the other wall is removably and slidably received upon the same transverse movement of one body structure relative to the other which connects said valve part to said valve actuating part.

11. Fluid delivering apparatus comprising a first body structure having an outlet through which fluid is discharged and containing a passage leading to said outlet, a valve part carried by said body structure and movable relative thereto along a predetermined axis between an open position for passing fluid to the outlet and a closed position for preventing fluid flow to the outlet, a power operated unit including a second body structure and a movable valve actuating part which is carried by said second body structure and is displaceable by power relative thereto and is operable upon such displacement to shift said valve part along said axis between open and closed positions, one of said body structures being movable relative to the other body structure essentially transversely of said axis between an assembled active position in which said valve actuating part is positioned to move said valve part axially and a separated position in which the valve actuating part can no longer move said valve part and the body structures are separated from one another for cleaning, and a releasable connection between said two body structures including interfitting means thereon movable into and out of interfitting connected relation by said movement of said one body structure relative to the other body structure transversely of said axis.

12. Fluid delivering apparatus as recited in claim 11, including a second connection for detachably securing said valve part and said valve actuating part together in said assembled active position.

13. Fluid delivering apparatus as recited in claim 11, in which said interfitting means include a groove formed in one of said body structures and slidably receiving and interfitting in connected relation with a projection carried by the other body structure upon said movement of one body structure relative to the other transversely of said axis.

14. Fluid delivering apparatus as recited in claim 11, in which said body structures have adjacent arcuate walls disposed essentially about said axis, said interfitting means including a groove formed in one of said walls and slidably engageable in interfitting relation with a projection on the other wall by said predetermined movement of one body structure relative to the other transversely of said axis, said groove and projection both being arcuate essentially about said axis and engaging through slightly more than 180 degrees about said axis, one of said walls being sufficiently resilient to enable said groove and projection to be forced slidably into holding relation, and to then releasably hold the body structures against separation.

15. Fluid delivering apparatus as recited in claim 14, including a releasable second connection for detachably interconnecting said valve part and said valve actuating part and including interfitting means on said parts movable into and out of interfitting connecting relation by the same transverse movement of one of the body structures relative to the other which interconnects said body structures.

16. Fluid delivering apparatus comprising a body containing a fluid passage extending generally vertically therethrough and having a bottom outlet through which fluid is discharged from the passage, an inlet passage leading into a side of said first mentioned passage for delivering fluid thereinto, an essentially upwardly facing valve seat formed in said first passage beneath the level of said inlet passage, a valve element movable generally vertically in said first passage between a closed position in which a surface at the underside of the valve element engages axially downwardly against said seat and an upper open position in which said seat engaging surface of the valve element is located above the level of at least a portion of said inlet passage to enable free flow of fluid therefrom to said outlet, a seal element mounted removably in said first passage above the level of said inlet passage, a shaft connected to the valve element to actuate it vertically and projecting upwardly from said valve element through said seal element in sliding sealed engagement therewith, and a power operated actuating unit acting against said shaft above said seal element and operable by power to actuate said shaft and the connected valve element between said two positions.

References Cited

UNITED STATES PATENTS

| | | | |
|---|---|---|---|
| 554,806 | 2/1896 | Warren | 53—273 |
| 1,069,948 | 8/1913 | Hartwig | 53—310 |
| 1,094,776 | 4/1914 | Brinkman | 53—310 |
| 1,748,961 | 3/1930 | Risser | 53—308 X |
| 3,087,518 | 4/1963 | Scholle | 141—83 |
| 3,195,587 | 7/1965 | Mattimoe et al. | 141—83 |
| 3,299,606 | 1/1967 | Weikert | 141—114 X |
| 2,596,532 | 5/1952 | Coolidge et al. | 251—62 |
| 3,160,331 | 12/1964 | Trumbull et al. | 222—504 |

STANLEY H. TOLLBERG, *Primary Examiner.*

TRAVIS S. McGEHEE, *Assistant Examiner.*